United States Patent
Amrhein et al.

(10) Patent No.: US 10,389,830 B2
(45) Date of Patent: Aug. 20, 2019

(54) DEVICE DELEGATION OF PUSH NOTIFICATION DISTRIBUTION

(71) Applicant: International Business Machines Corporation, Armonk, NY (US)

(72) Inventors: Dustin K. Amrhein, Zachary, LA (US); Kulvir S. Bhogal, Fort Worth, TX (US); Nitin Gaur, Round Rock, TX (US); Christopher D. Johnson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 14/622,214

(22) Filed: Feb. 13, 2015

(65) Prior Publication Data

US 2016/0241657 A1 Aug. 18, 2016

(51) Int. Cl.
*H04L 29/08* (2006.01)

(52) U.S. Cl.
CPC .......... *H04L 67/26* (2013.01); *H04L 67/2814* (2013.01)

(58) Field of Classification Search
CPC ..... H04L 67/26; H04L 45/24; H04L 67/2814; H04L 41/12; H04L 69/40; H04L 67/18; H04L 51/04; H04L 67/22; H04W 88/06; H04W 4/22; H04W 76/007; H04W 4/06; H04W 4/12; H04W 4/02; H04W 4/021; H04W 4/90; H04W 12/02; H04W 4/80; H04W 88/02; H04W 4/04; H04W 4/023; H04W 64/00; H04W 84/005; H04W 40/244; H04W 76/50; H04W 8/18; H04W 4/20; H04W 4/18; H04W 4/029; H04W 4/022; H04W 4/027; H04W 4/16
See application file for complete search history.

(56) References Cited

U.S. PATENT DOCUMENTS

| 7,298,714 | B2* | 11/2007 | Foster | H04L 12/1854 370/310 |
| 8,052,531 | B2 | 11/2011 | Onuki et al. | |
| 8,634,810 | B2* | 1/2014 | Barkie | H04W 12/02 455/410 |
| 8,793,397 | B2* | 7/2014 | Chan | G06Q 10/107 709/203 |
| 8,943,126 | B1* | 1/2015 | Feldman | H04W 4/02 709/203 |
| 9,674,684 | B1* | 6/2017 | Mendelson | H04W 4/90 |
| 2007/0076646 | A1* | 4/2007 | Foster | H04L 12/1854 370/315 |

(Continued)

OTHER PUBLICATIONS

Cohn, et al., "OASIS Message Queuing Telemetry Transport (MQTT) TC", OASIS, Copyright 2014, downloaded on Dec. 9, 2014, <https://www.oasis-open.org/committees/tc_home.php?wg_abbrev=mqtt>.

(Continued)

*Primary Examiner* — Sm A Rahman
*Assistant Examiner* — Ranjan Pant
(74) *Attorney, Agent, or Firm* — Daniel R. Simek (57) ABSTRACT

In an approach to delegating distribution of push notification messages, a computer processor identifies, based, at least in part, on at least one characteristic, a plurality of computing devices to receive push notification information, and sends the push notification information to each of the plurality of computing devices.

12 Claims, 4 Drawing Sheets

(56) References Cited

U.S. PATENT DOCUMENTS

| | | | | |
|---|---|---|---|---|
| 2009/0282123 | A1* | 11/2009 | Fornari | H04L 12/1836 709/207 |
| 2012/0215851 | A1 | 8/2012 | Wu et al. | |
| 2013/0034047 | A1* | 2/2013 | Chan | H04W 40/00 370/315 |
| 2013/0157692 | A1* | 6/2013 | Hall | H04L 12/1845 455/456.3 |
| 2013/0262203 | A1* | 10/2013 | Frederick | G06Q 30/0209 705/14.12 |
| 2013/0286942 | A1* | 10/2013 | Bonar | H04B 7/0689 370/328 |
| 2014/0092833 | A1* | 4/2014 | Vannithamby | H04W 4/70 370/329 |
| 2014/0095617 | A1* | 4/2014 | Chan | H04L 67/1097 709/204 |
| 2014/0120961 | A1* | 5/2014 | Buck | H04W 4/12 455/466 |
| 2014/0172727 | A1* | 6/2014 | Abhyanker | G06Q 50/30 705/307 |
| 2014/0189015 | A1* | 7/2014 | Chan | G06Q 10/107 709/204 |
| 2014/0304363 | A1* | 10/2014 | Mhatre | H04L 67/26 709/217 |
| 2014/0342714 | A1* | 11/2014 | Sanders | H04W 4/021 455/418 |
| 2015/0088624 | A1* | 3/2015 | Frederick | G06Q 30/0209 705/14.12 |
| 2015/0244823 | A1* | 8/2015 | Lim | H04L 67/26 709/203 |
| 2015/0302030 | A1* | 10/2015 | Vaccari | G06F 16/9537 707/724 |
| 2016/0044625 | A1* | 2/2016 | Anesi | H04W 64/00 455/411 |
| 2016/0192166 | A1* | 6/2016 | deCharms | H04W 4/021 348/14.02 |
| 2016/0203522 | A1* | 7/2016 | Shiffert | H04W 76/14 705/14.58 |
| 2018/0005465 | A1* | 1/2018 | Truong | H04W 4/80 |

OTHER PUBLICATIONS

Courtenage, et al., "The Design and Implementation of a P2P-Based Composite Event Notification System", Proceedings of the 20th International Conference on Advanced Information Networking and Applications (AINA'06), Copyright 2006, <http://ieeexplore.ieee.org/xpl/login.jsp?tp=&arnumber=1620270&url=http%3A%2F%2Fieeexplore.ieee.org%2Fxpls%2Fabs_all.jsp%3Farnumber%3D1620270>.

Mahambre, et al., "Reliable Routing of Event Notifications over P2P Overlay Routing Substrate in Event Based Middleware", Parallel and Distributed Processing Symposium, 2007 (IPDPS 2007), Mar. 26-30, 2007, IEEE International, <http://ieeexplore.ieee.org/stamp/stamp.jsp?tp=&arnumber=4228386>.

Sandler, et al., "FeedTree: Sharing Web micronews with peer-to-peer event notification", IPTPS 2005, <http://iptps05.cs.cornell.edu/PDFs/CameraReady_221.pdf>.

* cited by examiner

DEVICE DELEGATION OF PUSH NOTIFICATION DISTRIBUTION

BACKGROUND OF THE INVENTION

The present invention relates generally to the field of message notification, and more particularly to delegating push notification transmission to computing devices.

Push notification is Internet-based communication where delivery of information proceeds from a software application server to a client computing device without a specific request from the client computing device. Push notifications are generally based on preferences a client determines in advance, and whenever content aligning with the preferences is available, the software application server pushes the content to the client. Typically, push notifications are sent through a centralized server where the notifications can be sent, filtered, and managed, however the centralized server can also constitute a single point of failure for the push notification system. Additional concerns with typical push notification systems arise in geographic regions with little to no network infrastructure, particularly when these regions experience natural disasters or other emergency situations requiring the rapid distribution of push notification messages and alerts.

SUMMARY

Embodiments of the present invention disclose a method, a computer program product, and a computer system for delegating distribution of push notification messages. In the method, a computer processor identifies, based, at least in part, on at least one characteristic, a plurality of computing devices to receive push notification information, and sends the push notification information to each of the plurality of computing devices.

DETAILED DESCRIPTION

Figure 1:
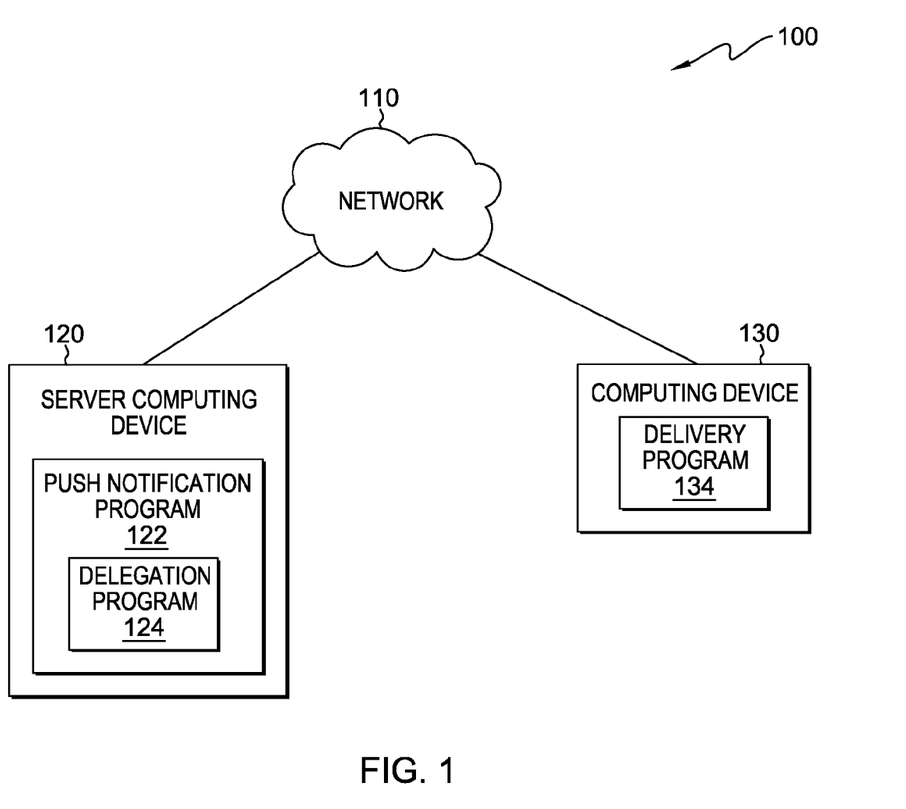
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of one implementation and does not imply any limitations with regard to the environments in which different embodiments may be made by those skilled in the art without departing from the scope of the invention as recited by the claims.

Data processing environment 100 includes server computing device 120 and computing device 130, interconnected via network 110. Network 110 can be, for example, a telecommunications network, a local area network (LAN), a wide area network (WAN), such as the Internet, or a combination of the three, and can include wired, wireless, or fiber optic connections. Network 110 may include one or more wired and/or wireless networks that are capable of receiving and transmitting data, voice, and/or video signals, including multimedia signals. In general, network 110 can be any combination of connections and protocols that will support communications between server computing device 120, computing device 130, and other computing devices (not shown) within data processing environment 100.

In various embodiments, server computing device 120 can be a standalone computing device, management server, a web server, a mobile computing device, or any other electronic device or computing system capable of receiving, sending, and processing data. In other embodiments, server computing device 120 can represent a server computing system utilizing multiple computers as a server system. In another embodiment, server computing device can be a laptop computer, a tablet computer, a netbook computer, a personal computer, a desktop computer, or any programmable electronic device capable of communicating with other computing devices (not shown) within data processing environment 100 via network 110. In another embodiment, server computing device 120 represents a computing system utilizing clustered computers and components (e.g., database server computers, application server computers, etc.) that act as a single pool of seamless resources when accessed within data processing environment 100.

In an exemplary embodiment, server computing device 120 is a central gateway server, or a push notification server, which operates as a centralized point through which secure push notification messages can be sent, filtered, and managed. Server computing device 120 includes push notification program 122 and delegation program 124. In various embodiments, each of the programs included on server computing device 120 may be located elsewhere within data processing environment 100 with access to server computing device 120 and computing device 130 via network 110. Server computing device 120 may include internal and external hardware components, as depicted and described with reference to FIG. 4.

Push notification program 122 operates to send secure push notification messages. In various embodiments, push notification program 122 determines whether to send particular push notification messages based on preferences pre-determined by each computing device in data processing environment 100. Delegation program 124 resides in push notification program 122 and operates to identify computing devices for delegating push notification transmission, in particular for receiving push notification information, which includes a push notification message and information associated with the push notification, such as instructions for distribution of the push notification message. Delegation program 124 identifies devices based on a plurality of characteristics of each device, for example, battery power, network strength, and geographical location, and sends the push notification information to each device. Delegation program 124 then determines whether a confirmation is received indicating the push notification message was distributed according to the instructions. In various embodiments, the functions and capabilities of delegation program 124 may be performed by push notification program 122, by an add-on to push notification program 122, or by a program located elsewhere in data processing environment 100 with access to push notification program 122 and server computing device 120 via network 110.

Computing device 130, in various embodiments, can be a laptop computer, a tablet computer, a smartphone, or any programmable electronic device capable of communicating with server computing device 120 via network 110, and with various components and devices (not shown) within data processing environment 100. Computing device 130 may be a wearable computer. Wearable computers are electronic devices that may be worn by the bearer under, with, or on top of clothing, as well as in glasses, hats, wigs, or other accessories, and are capable of receiving, processing, storing, sending, and displaying data. In an exemplary embodiment, computing device 130 is a mobile computing device, for example, a smartphone or tablet computer. In general, computing device 130 represents any programmable electronic device capable of executing machine readable program instructions and communicating with other computing devices via a network, such as network 110. While depicted in FIG. 1 as a single computing device, in various embodiments, computing device 130 may represent one, or a plurality of computing devices. Computing device 130 includes delivery program 134.

In an exemplary embodiment of the present invention, delivery program 134 is a push notification delivery agent for receiving a push notification message from a push notification server, for example, server computing device 120, and sending the push notification message to other computing devices in data processing environment 100 (not shown), according to instructions received from the push notification server. Delivery program 134 can also issue a confirmation to the push notification server indicating the push notification message was distributed according to the instructions. In various embodiments, delivery program 134 is mobile application software, or an "app," that is a computer program designed to run on smart phones, tablet computers and other mobile devices.

Figure 2:
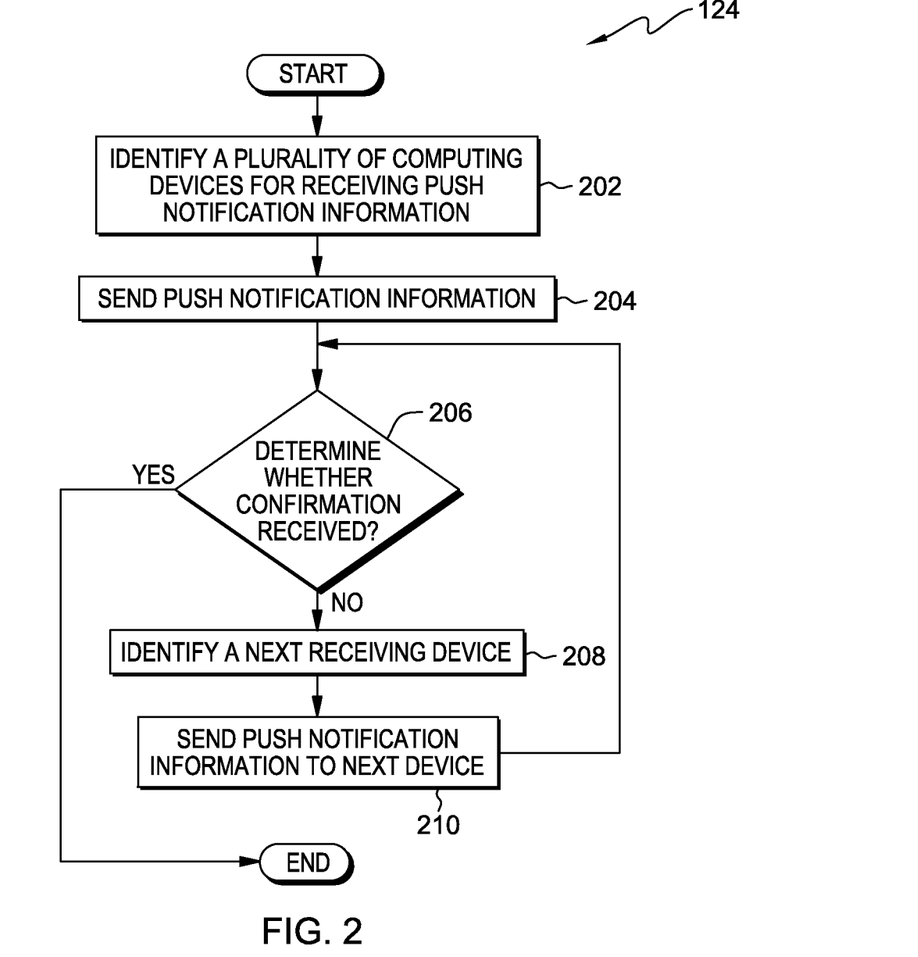
FIG. 2 is a flowchart depicting operational steps of a delegation program, for delegating push notification transmission to computing devices, in accordance with an embodiment of the present invention.

FIG. 2 is a flowchart depicting operational steps of delegation program 124, for delegating push notification transmission to computing devices, in accordance with an embodiment of the present invention.

Delegation program 124 identifies a plurality of computing devices for receiving push notification information (202). In an exemplary embodiment, the computing devices identified, for example, computing device 130, are mobile computing devices. Delegation program 124 identifies the computing devices based on at least one of a plurality of characteristics, including, but not limited to, battery power, network strength, device type, connection speed, CPU strength, geographical location, a number of other devices nearby, etc. For example, a device with a high speed processor or fast network ability may be identified for receiving push notification information over a lower speed processor or a device with limited network bandwidth. In an embodiment, delegation program 124 identifies computing devices for receiving push notification information based on the whether the device is registered to receive a particular push notification message, for example, a message pertaining to a particular subject matter, or a message pertaining to a particular location. For example, an emergency service may operate a push notification server to notify citizens of a city, county, state, or other geographic region of emergency situations, such as a tornado's projected path. Several computing devices in the geographic region with high speed processing capabilities and fast network bandwidth may be identified to receive the push notification information in order to rapidly send the push notification message regarding the tornado to many other computing devices in the region.

Delegation program 124 sends push notification information to the receiving device (204). Upon identifying the plurality of computing devices, delegation program 124 sends the push notification information, including, for example, the push notification message, instructions for distribution of the push notification message, and a list of devices to which to send the message, to each computing device.

In an embodiment, delegation program 124 determines whether an identified receiving device accepts responsibility for push notification message distribution prior to sending the push notification information to the receiving device. If the receiving device does not accept the responsibility, then delegation program 124 returns to identify additional devices, based on at least one of the plurality of characteristics, for receiving the push notification information.

In another embodiment, delegation program 124 sends push notification information to identified receiving devices based on at least one criteria determined for each of the receiving devices, such as a location of the receiving device. For example, a push notification message may include a coupon for a retail store, however, the push notification message is only to be sent to those devices within a five mile vicinity of the retail store. Delegation program 124 may identify a plurality of devices for receiving the push notification message, but may only send the push notification information to certain devices, based on the at least one criteria, for example, the devices within the five mile vicinity.

Delegation program 124 determines whether confirmation is received (decision block 206). Delegation program 124 receives a confirmation from each computing device that the push notification message was distributed according to the push notification instructions. In various embodiments, delegation program 124 waits a pre-determined interval of time for the confirmation. The pre-determined interval may be a default time period, or may be set by an administrator or manager of delegation program 124 or server computing device 120. The confirmation may be a message indicating the push notification message was sent, and may include a time stamp for the time at which the message was sent. If confirmation is received (decision block 206, "yes" branch), then delegation program 124 ends processing. In an embodiment, delegation program 124 does not determine whether confirmation is received after sending the push notification information.

If delegation program 124 determines confirmation is not received (decision block 206, "no" branch), then delegation program 124 identifies a next receiving device (208). After the pre-determined interval of time has passed and no confirmation is received from the computing device, delegation program 124 identifies the next receiving device based on the plurality of characteristics, for example, delegation program 124 may locate additional devices in a geographic location or of a certain device type.

Delegation program 124 sends push notification information to the next device (210). Upon sending the push notification message and information to the next device, delegation program 124 returns to determine whether a confirmation was received from the next device.

Figure 3:
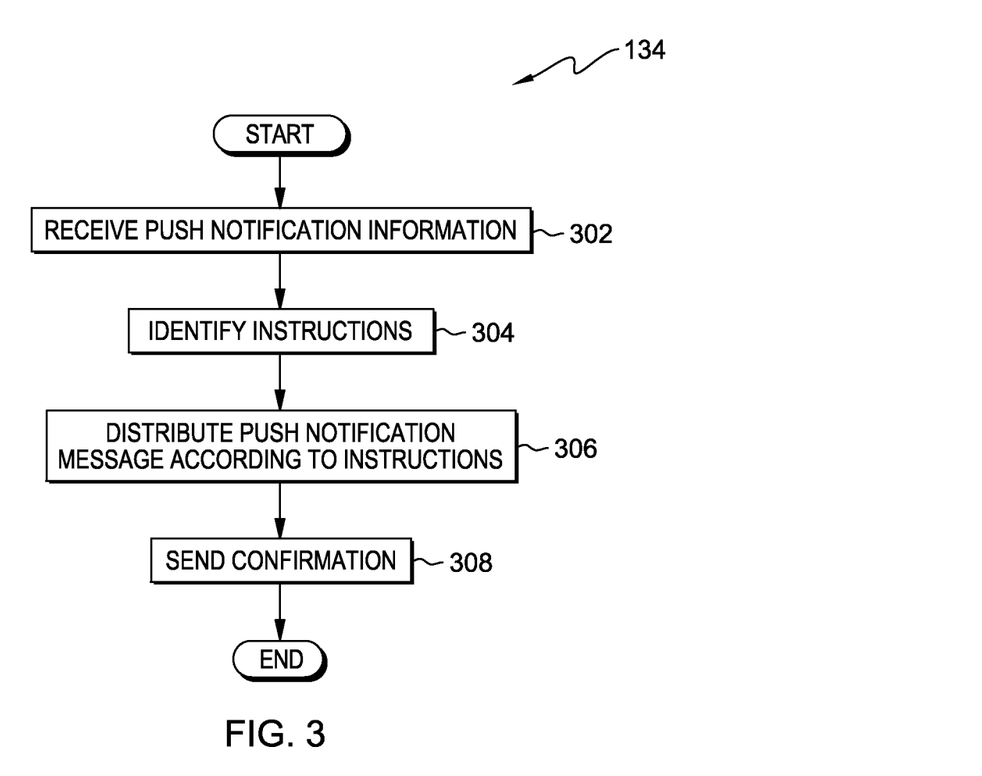
FIG. 3 illustrates operational steps of a delivery program, for distributing push notification messages according to received instructions, in accordance with an embodiment of the present invention.

FIG. 3 illustrates operational steps of delivery program 134, for distributing push notification messages according to received instructions, in accordance with an embodiment of the present invention.

Delivery program 134 receives push notification information (302). The push notification information includes, for example, a push notification message and instructions for distribution of the message. In an embodiment, delivery program 134 determines whether to accept the responsibility of receiving the push notification information prior to receiving.

Delivery program 134 identifies instructions contained in the push notification information (304). The instructions in the push notification information may include, for example, a list of devices to which the push notification message is to be distributed. In an embodiment, delivery program 134 may identify instructions indicating delivery program 134 is to send the push notification information, including instructions for distribution, to further identified computing devices.

Delivery program 134 distributes the push notification message according to the instructions (306) and sends confirmation (308). Upon sending the message to the computing devices as instructed, delivery program 134 notifies the push notification server, for example, server computing device 120, that the push notification message is sent.

Figure 4:
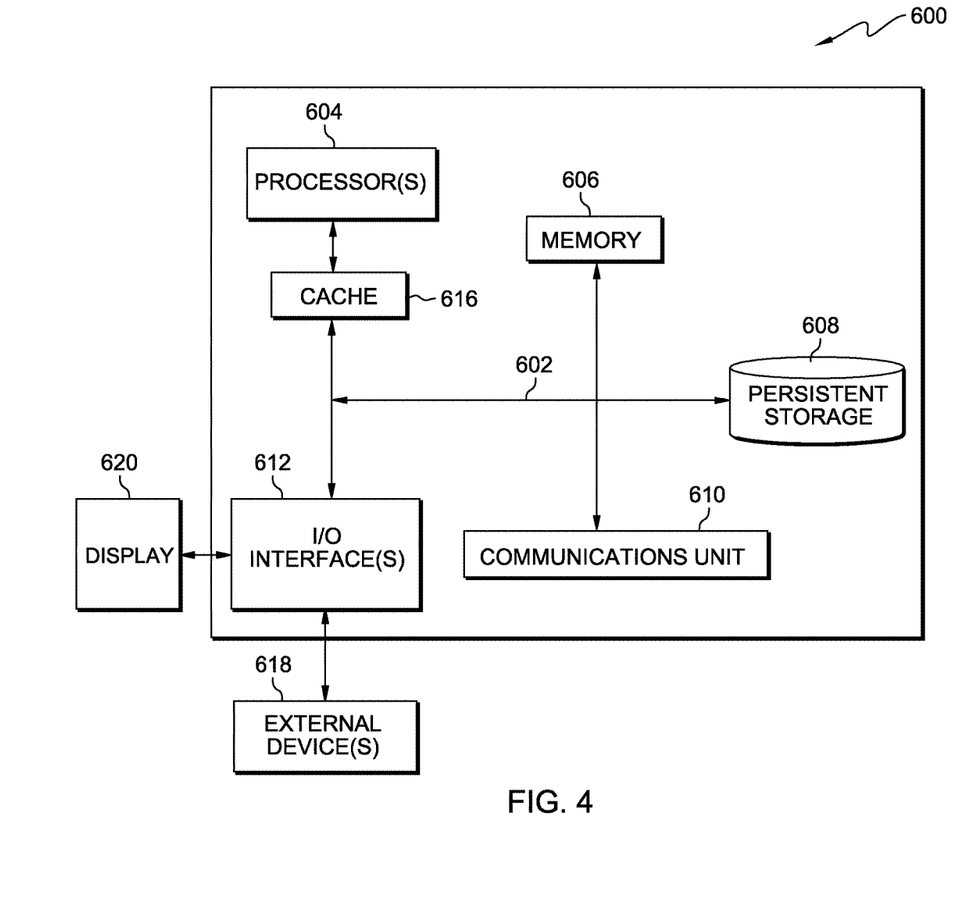
FIG. 4 is a block diagram of components of a data processing system, such as the server computing device of FIG. 1, in accordance with an embodiment of the present invention.

FIG. 4 depicts a block diagram of components of a computer system 600, which is an example of a system such as server computing device 120 of FIG. 1, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media or computer readable storage devices. In this embodiment, memory 606 includes random access memory (RAM). In general, memory 606 can include any suitable volatile or non-volatile computer readable storage media. Cache 616 is a fast memory that enhances the performance of processor(s) 604 by holding recently accessed data and data near accessed data from memory 606.

Program instructions and data used to practice embodiments of the present invention may be stored in persistent storage 608 for execution by one or more of the respective processor(s) 604 via cache 616 and one or more memories of memory 606. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface(s) 612 may provide a connection to external device(s) 618 such as a keyboard, a keypad, a touch screen, and/or some other suitable input device. External device(s) 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to a display 620. Display 620 provides a mechanism to display data to a user and may be, for example, a computer monitor or an incorporated display screen, such as is used, for example, in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for delegating distribution of push notification messages, the method comprising:

determining, by one or more processors, whether a push notification message includes an associated indication that the push notification message is intended for distribution within a defined location;

in response to determining that the push notification message does include an associated indication to that the push notification message is intended for distribution within the defined location, identifying, by one or more computer processors, based, at least in part, on a plurality of characteristics, a plurality of computing devices, that are operating within the defined location, to receive push notification information, wherein the push notification information includes at least the push notification message, an indication of subject matter of the push notification, an instruction for distribution of the push notification message, and a list of one or more computing devices to which the push notification message is to be distributed, and wherein the plurality of characteristics includes a central processing unit (CPU) speed of a computing device, a computing device type, a network connection speed corresponding to a computing device, and a battery power level of the device;

determining, by one or more computer processors, a first criteria for each of the plurality of computing devices, the first criteria including an indication of a number of other devices, of the list of one or more computing devices to which the push notification message is to be distributed, that are nearby a respective computing device;

determining, by one or more computer processors, a second criteria for each of the plurality of computing devices, the second criteria indicating whether a respective computing device is registered to receive and distribute the subject matter of the push notification;

identifying, by one or more computer processors, at least a first computing device of the plurality of computing devices that satisfies the first criteria and the second criteria;

prior to sending the push notification information to the identified first computing device, determining, by one or more processors, whether the identified first computing device accepts responsibility for push notification distribution; and sending, by one or more computer processors, the push notification information to the identified first computing device.

2. The method of claim 1, wherein at least one of the plurality of computing devices is a mobile computing device.

3. The method of claim 1, further comprising:
determining, by one or more computer processors, whether a confirmation is received from each of the plurality of computing devices, wherein the confirmation indicates each of the plurality of computing devices distributed the push notification information according to an instruction.

4. The method of claim 1, further comprising:
responsive to determining that the identified first computing device does not accept responsibility for push notification distribution, identifying, by one or more processors, a second computing device of the plurality of computing devices, based, at least in part, on a determination that the number of other devices are nearby the second computing device; and
prior to sending the push notification information to the identified second computing device, determining, by one or more processors, whether the identified second computing device accepts responsibility for push notification distribution.

5. A computer program product for delegating distribution of push notification messages, the computer program product comprising a computer readable storage medium having program instructions embodied therewith, the program instructions executable by a computer processor to cause the computer processor to perform a method comprising:
determining, by one or more processors, whether a push notification message includes an associated indication that the push notification message is intended for distribution within a defined location;
in response to determining that the push notification message does include an associated indication to that the push notification message is intended for distribution within the defined location, identifying, by one or more computer processors, based, at least in part, on a plurality of characteristics, a plurality of computing devices, that are operating within the defined location, to receive push notification information,
wherein the push notification information includes at least the push notification message, an indication of subject matter of the push notification, an instruction for distribution of the push notification message, and a list of one or more computing devices to which the push notification message is to be distributed, and
wherein the plurality of characteristics includes a central processing unit (CPU) speed of a computing device, a computing device type, a network connection speed corresponding to a computing device, and a battery power level of the device;

determining, by one or more computer processors, a first criteria for each of the plurality of computing devices, the first criteria including an indication of a number of other devices, of the list of one or more computing devices to which the push notification message is to be distributed, that are nearby a respective computing device;

determining, by one or more computer processors, a second criteria for each of the plurality of computing devices, the second criteria indicating whether a respective computing device is registered to receive and distribute the subject matter of the push notification;

identifying, by one or more computer processors, at least a first computing device of the plurality of computing devices that satisfies the first criteria and the second criteria;

prior to sending the push notification information to the identified first computing device, determining, by one or more processors, whether the identified first computing device accepts responsibility for push notification distribution; and sending, by one or more computer processors, the push notification information to the identified first computing device.

6. The computer program product of claim 5, wherein at least one of the plurality of computing devices is a mobile computing device.

7. The computer program product of claim 5, further comprising:
determining, by one or more computer processors, whether a confirmation is received from each of the plurality of computing devices, wherein the confirmation indicates each of the plurality of computing devices distributed the push notification information according to an instruction.

8. The computer program product of claim 5, further comprising:
responsive to determining that the identified first computing device does not accept responsibility for push notification distribution, identifying, by one or more processors, a second computing device of the plurality of computing devices, based, at least in part, on a determination that the number of other devices are nearby the second computing device; and
prior to sending the push notification information to the identified second computing device, determining, by one or more processors, whether the identified second computing device accepts responsibility for push notification distribution.

9. A computer system for delegating distribution of push notification messages, the computer system comprising:
one or more computer processors;
one or more computer readable storage devices;

program instructions stored on the one or more computer readable storage devices for execution by at least one of the one or more computer processors, the program instructions comprising:

program instruction to determine whether a push notification message includes an associated indication that the push notification message is intended for distribution within a defined location;

in response to determining that the push notification message does include an associated indication to that the push notification message is intended for distribution within the defined location, program instructions to identify, based, at least in part, on a plurality of characteristics, a plurality of computing devices, that are operating within the defined location, to receive push notification information, wherein the push notification information includes at least the push notification message, an indication of subject matter of the push notification, an instruction for distribution of the push notification message, and a list of one or more computing devices to which the push notification message is to be distributed, and wherein the plurality of characteristics includes a central processing unit (CPU) speed of a computing device, a computing device type, a network connection speed corresponding to a computing device, and a battery power level of the device;

program instructions to determine a first criteria for each of the plurality of computing devices, the first criteria including an indication of a number of other devices, of the list of one or more computing devices to which the push notification message is to be distributed, that are nearby a respective computing device;

program instructions to determine a second criteria for each of the plurality of computing devices, the second criteria indicating whether a respective computing device is registered to receive and distribute the subject matter of the push notification;

program instructions to identify at least a first computing device of the plurality of computing devices that satisfies the first criteria and the second criteria;

prior to sending the push notification information to the identified first computing device, program instructions to determine whether the identified first computing device accepts responsibility for push notification distribution; and program instructions to send the push notification information to the identified first computing device.

10. The computer system of claim 9, wherein at least one of the plurality of computing devices is a mobile computing device.

11. The computer system of claim 9, further comprising:

program instructions to determine whether a confirmation is received from each of the plurality of computing devices, wherein the confirmation indicates each of the plurality of computing devices distributed the push notification information according to an instruction.

12. The computer system of claim 9, further comprising:

responsive to determining that the identified first computing device does not accept responsibility for push notification distribution, program instructions to identify a second computing device of the plurality of computing devices, based, at least in part, on a determination that the number of other devices are nearby the second computing device; and prior to sending the push notification information to the identified second computing device, program instructions to determine whether the identified second computing device accepts responsibility for push notification distribution.

* * * * *